(12) United States Patent
Fischer

(10) Patent No.: US 6,287,040 B1
(45) Date of Patent: Sep. 11, 2001

(54) BALL-AND-SOCKET JOINT

(75) Inventor: Markus Fischer, Steinfelden (DE)

(73) Assignee: ZF Lemforder Metallwaren AG (DE)

( * ) Notice: Subject to any disclaimer, the term of this patent is extended or adjusted under 35 U.S.C. 154(b) by 0 days.

(21) Appl. No.: 09/181,443

(22) Filed: Oct. 28, 1998

(30) Foreign Application Priority Data

Oct. 30, 1997 (DE) ............................................. 197 47 931

(51) Int. Cl.[7] ........................... F16C 11/00; F16D 1/12
(52) U.S. Cl. ....................... 403/137; 277/635; 403/132
(58) Field of Search .................................. 403/134, 135, 403/137, 122, 132; 277/635

(56) References Cited

U.S. PATENT DOCUMENTS

| | | | |
|---|---|---|---|
| 3,248,955 | 5/1966 | Templeton | 74/18.1 |
| 4,448,562 | * 5/1984 | Rose | 403/134 |
| 4,720,205 | * 1/1988 | Ito | 403/140 |
| 4,787,608 | * 11/1988 | Elliott | 267/64.27 |
| 5,066,459 | * 11/1991 | Urbach | 403/134 |
| 5,090,743 | * 2/1992 | Obering | 285/156 |
| 5,092,704 | * 3/1992 | Buhl et al. | 403/134 |
| 5,100,254 | * 3/1992 | Wasada | 403/134 |
| 5,246,515 | * 9/1993 | Roedseth et al. | 156/131 |
| 5,267,805 | * 12/1993 | Ueno et al. | 403/134 |
| 5,318,373 | * 6/1994 | Buhl et al. | 403/134 |
| 5,601,305 | * 2/1997 | Nordloh et al. | 280/674 |
| 5,601,378 | * 2/1997 | Fukukawa et al. | 403/140 |
| 5,611,635 | * 3/1997 | Schutt et al. | 403/141 |
| 5,876,149 | * 3/1999 | Dorr et al. | 403/134 |

FOREIGN PATENT DOCUMENTS

| | | |
|---|---|---|
| GM 1 985 454 | 5/1968 | (DE) . |
| 2 001 005 | 2/1971 | (DE) . |
| 41 12 791 C1 | 7/1992 | (DE) . |
| 0 142 686 | 11/1986 | (EP) . |

* cited by examiner

Primary Examiner—Lynne H. Browne
Assistant Examiner—John B. Walsh
(74) Attorney, Agent, or Firm—McGlew and Tuttle, P.C.

(57) ABSTRACT

A ball-and-socket joint for motor vehicles is described which includes a housing (3), a bearing shell (4), which is inserted into the housing and accommodates a joint ball (1.3) of a ball pivot (1) exiting from the housing on at least one side movably in all directions. The ball pivot is provided with a connection contour (1.4) on the side opposite the joint ball. The ball-and-socket joint also includes a sealing element (2) in the form of bellows, which is sealingly in contact with the housing, on the one hand, and with a shoulder (1.5) of the ball pivot, on the other hand. A circular ring collar (1.1) provided with an undercut contour is made in one piece with the ball pivot (1). The sealing element (2) is inserted with its area (2.1) that is sealingly in contact with the ball pivot (1) into the annular space (1.2) formed by the undercut under elastic pretension.

10 Claims, 3 Drawing Sheets

BALL-AND-SOCKET JOINT

FIELD OF THE INVENTION

The present invention pertains to a ball-and-socket joint for motor vehicles.

BACKGROUND OF THE INVENTION

Various designs of such ball-and-socket joints have been known. They are used, e.g., as support joints or as guiding joints in the area of the wheel suspension. These types of joints have a housing open on one side, into which a one-part or multipart bearing shell is inserted. The joint ball of a ball pivot, which exits from the housing side that is open on one side and which is provided with a connection contour on the side located opposite the joint ball, is accommodated within the bearing shell movably in all directions.

For example, threads or fits, which may in turn be combined with grooves milled in the ball pivot, are used as the connection contour in the known manner. A bolt inserted into the wheel carrier engages this groove, and the bolt thus acts as a captivating means.

A sealing element in the form of a bellows, which surrounds the ball pivot, on the one hand, and is sealingly fixed at the housing of the ball-and-socket joint, on the other hand, is usually used as a sealing means for the ball-and-socket joint. To improve the sealing function, clamping rings may be additionally provided at the sealing element. Moreover, it has been known that the contact areas of the sealing element with the housing or the ball pivot may be provided with complementary, labyrinth-like contours.

DE 41 12 791 C1 describes, e.g., an axle strut joint with a joint housing, in which a pivotably movable ball pivot, which is formed by a ball body and two pivot projections projecting from same on diametrically opposed sides, is mounted with the interposition of at least one bearing shell. The pivot projections pass through openings of the housing. One sealing bellows each is arranged in the area of each opening of the housing between the joint housing, on the one hand, and the corresponding pivot projection, on the other hand. The housing-side edge area of each sealing bellows is held at the inner wall of the housing by means of a clamping ring, and the clamping ring is supported at a ring projection of the housing, which forms the edge of the opening of the housing and is directed inwardly. The clamping ring has an L-shaped design and is equipped with a first leg, which extends essentially in the axial direction of the housing and is springily elastic in the radial direction, and with a second leg, which extends approximately at right angles thereto, and is fastened on the side of the sealing bellows that is the outer side relative to the sealed inner wall of the housing, at its edge area having a correspondingly L-shaped profile.

This joint has the peculiarity that the ball pivot projects from the joint housing on both sides.

The drawback of such a ball-and-socket joint is, however, that besides its complicated design, it cannot assume an optimal sealing function over a long life cycle. An annular groove, into which the sealing bellows is inserted, is milled in the pivot.

The sealing bellows is in contact in this annular groove with the ball pivot under pretension, which is additionally increased by a clamping ring. However, there is a risk at this connection point of the components that contaminants may be deposited. These may be, e.g., detergents, oil residues or salt-containing solutions, which frequently occur during the operation of a vehicle during the wintertime. Thus, highly corrosive media sometimes enter this area of the ball-and-socket joint and they gradually lead to corrosion phenomena on the ball pivot, and this corrosion in turn facilitates the penetration of contaminants or moisture due to increasing porosity of the surface. The inevitable consequence is the accelerated destruction of the joint.

SUMMARY AND OBJECTS OF THE INVENTION

The basic technical problem to be solved by the present invention is to develop a ball-and-socket joint that prevents the deposit of contaminants at the connection point between the sealing element and the ball pivot and thus protects the ball pivot in this area from corrosion as well as the inner components of the joint from the penetration of moisture and contaminants, so that the service life of such a ball-and-socket joint is prolonged.

According to the invention, a ball-and-socket joint is provided for motor vehicles. The joint includes a housing, a bearing shell, which is inserted into the housing. The bearing shell accommodates the joint ball of at least one ball pivot projecting, from the housing on at least one side, movably in all directions. The ball pivot is provided with a connection contour on the end side, as well as a sealing element in the form of bellows. The bellows sealing element is in sealing contact with the housing, on the one hand, and with a shoulder of the ball pivot, on the other hand. A circular ring collar is made in one piece with the ball pivot. The ring collar is provided with a markedly undercut contour and the sealing element is inserted under elastic pretension into the annular space formed by the undercut with an area that is in sealing contact with the ball pivot.

It is proposed according to the present invention that a circular ring collar, provided with an undercut contour, be made in one piece with the ball pivot. The sealing element with its area in sealing contact with the ball pivot is inserted according to the present invention under elastic pretension into the annular space at the ball pivot shaft, which annular space is formed by the undercut and is located radially on the inside, so that the circular ring collar covers the edge area of the sealing element.

It is achieved due to such a design of a ball pivot that contaminants are no longer able to settle at the ball pivot or in the contact area between the ball pivot and the sealing element.

The free surface of the ring collar should therefore be made as flat as possible. The ring collar may be made in one piece with the ball pivot or may be recessed from it according to prior-art processes. Thus, a subsequent machining of the ball pivot is just as conceivable as manufacturing in one piece according to a cold flow process, or, e.g., a subsequent deformation of an originally radially extending ring collar made in one piece with the ball pivot.

A ball-and-socket joint according to the present invention may consequently be a guiding joint provided with a housing that is open on one side. According to the present invention, the ring collar has a contour of a hook-shaped cross section, whose pointed edge area points in the direction of the joint ball of the ball pivot.

A guiding joint is known to be equipped with a housing that is open on one side. The ball pivot is in a so-called "upright" arrangement, i.e., it is inserted into the wheel carrier from the bottom. The contaminants or the splash water reach the ball-and-socket joint from the fastening side of the ball pivot in the wheel carrier. It is for this reason that the circular ring collar is made in one piece with the ball pivot in the above-described manner. A possibility of drainage is thus provided via the ring collar, which is provided with a smooth surface on the outside, and the sealing element, and this additionally effectively prevents the contaminants from hardening.

In addition, contours of the ring collar, which have, e.g., a U-, L-, V-shaped or similar cross geometry when viewed in the cross section, are also within the scope of the present invention.

According to another embodiment of a ball-and-socket joint according to the present invention, the sealing element has a reinforced bead in the contact area of the ball pivot, and this bead is inserted into the annular space of the ring collar formed by the undercut. Moreover, the pretension of the sealing element may be increased by at least one additional tensioning means.

Clamping rings may be used as tensioning means in the known manner.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
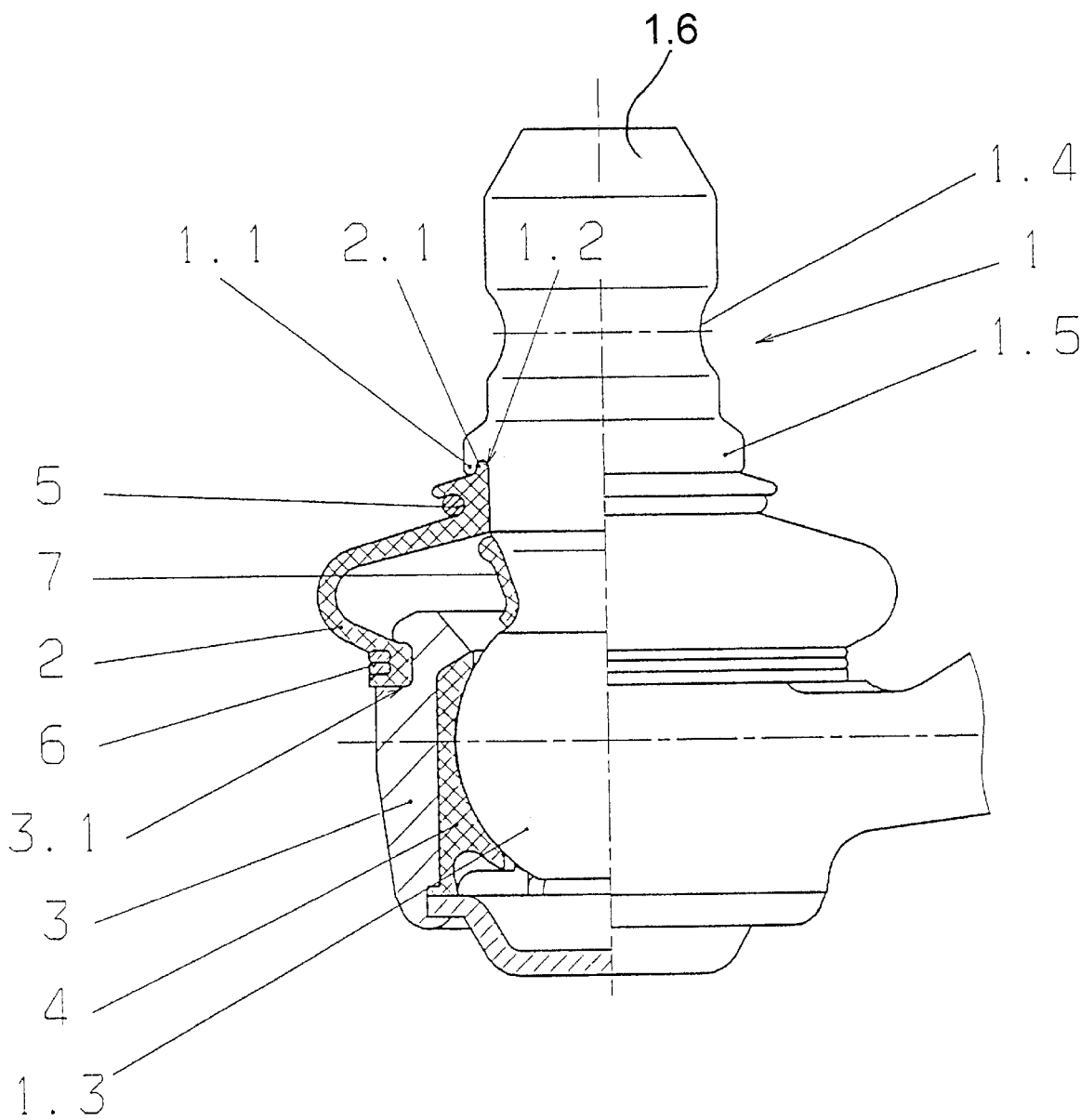
FIG. 1 is a partial sectional view of a ball-and-socket joint according to the present invention.

Referring to the drawings in particular, the exemplary embodiment shown in FIG. 1 is a guiding joint as it is used in the wheel suspension of a motor vehicle. The guiding joint comprises a housing 3, into which a bearing shell 4 formed of a limitedly elastic plastic is inserted. A ball pivot 1 includes a joint ball 1.3 and a shaft 1.6. The shaft 1.6 exits from the housing 3 on one side, and the joint ball 1.3 is accommodated within the bearing shell movably in all directions. This ball pivot 1 is provided with a connection contour 1.4 on the side of the shaft 1.6 opposite the joint ball 1.3. A force fit connection in combination with a groove provided in the ball pivot 1 to provide a captivating means is used as the connection contour in the embodiment shown. This form of fastening the pivot has been known, e.g., in guiding joints. A sealing element 2 in the form of bellows is located, on the one hand, in an annular groove 3.1 recessed in the housing 3, and, on the other hand, in sealing contact with a shoulder 1.5 of the ball pivot 1. Furthermore, a circular ring collar 1.1 provided with an undercut contour is made in one piece with the ball pivot 1.

The sealing element 2 is inserted with its collar section or collar area 2.1 that is sealingly in contact with the ball pivot 1 under elastic pretension into the annular space 1.2 formed by the undercut. The collar section is according to the present invention, the ring collar 1.1 shall cover the collar area or contact area 2.1 of the sealing element 2 in the axial direction as extensively as possible, so that moisture or contaminants will be removed at the outer, free surface of the ring collar 1.1. These foreign substances are thus effectively prevented from entering the interior of the ball-and-socket joint and contaminants are effectively prevented from depositing in the edge area of the sealing element. The ring collar 1.1 has a contour of hook-shaped cross section for this purpose, whose pointed edge area points in the direction of the joint ball 1.3 of the ball pivot 1.

The sealing element is pressed by clamping rings 5 and 6 against the corresponding contact areas under pretension in the known manner. A spacer ring 7 prevents an unintended axial displacement of the sealing element 2 in the direction of the joint ball 1.3.

Figure 2:
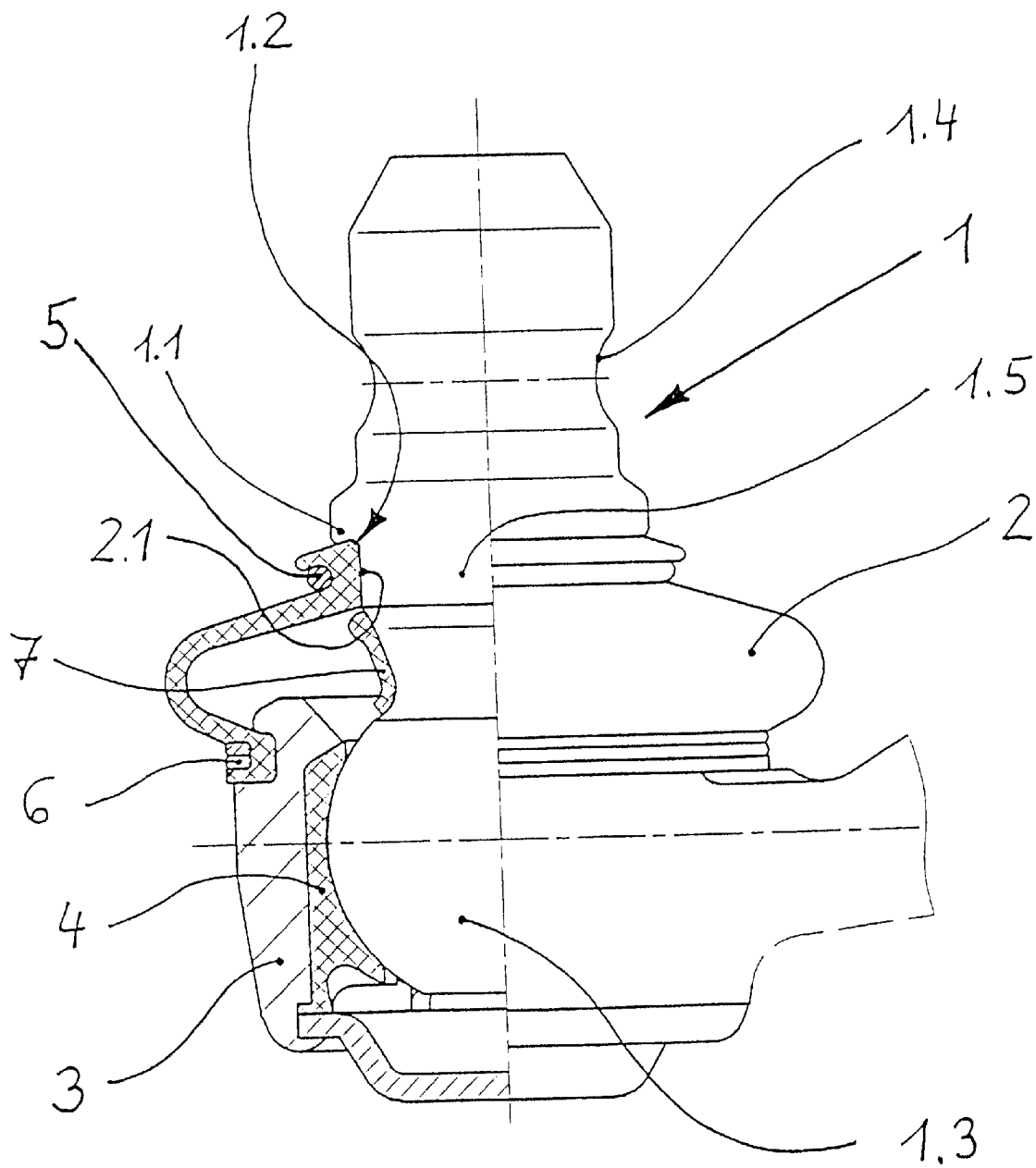
FIG. 2 is a partial sectional view of another ball-and-socket joint according to the present invention.

Unlike in the ball-and-socket joint according to the present invention described in FIG. 1, the joint shown in FIG. 2 has a ring collar 1.1 of an approximately L-shaped cross section. The ring collar likewise covers the collar section or contact area 2.1 of the sealing element 2. This joint otherwise has the same design as the one described above.

Figure 3A:
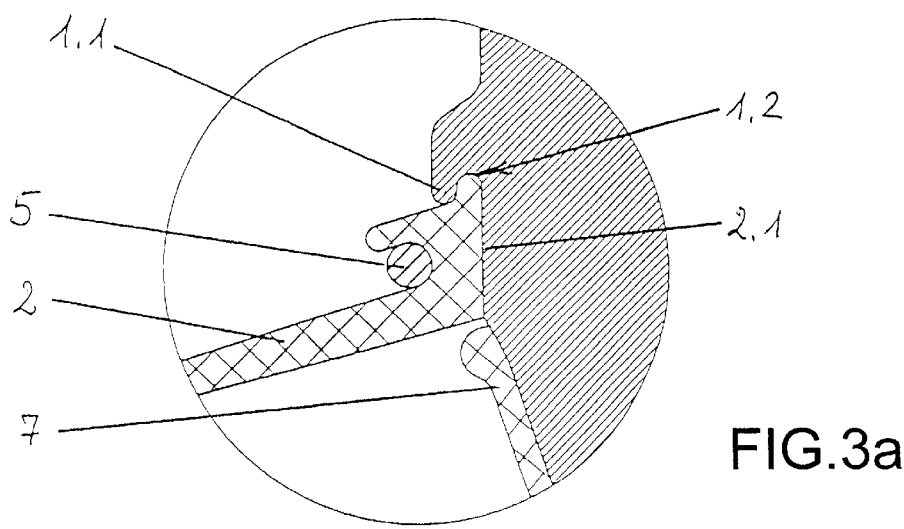
FIG. 3a is a partial sectional view of a U-shaped ring collar of a ball-and-socket joint according to the present invention.
Figure 3B:
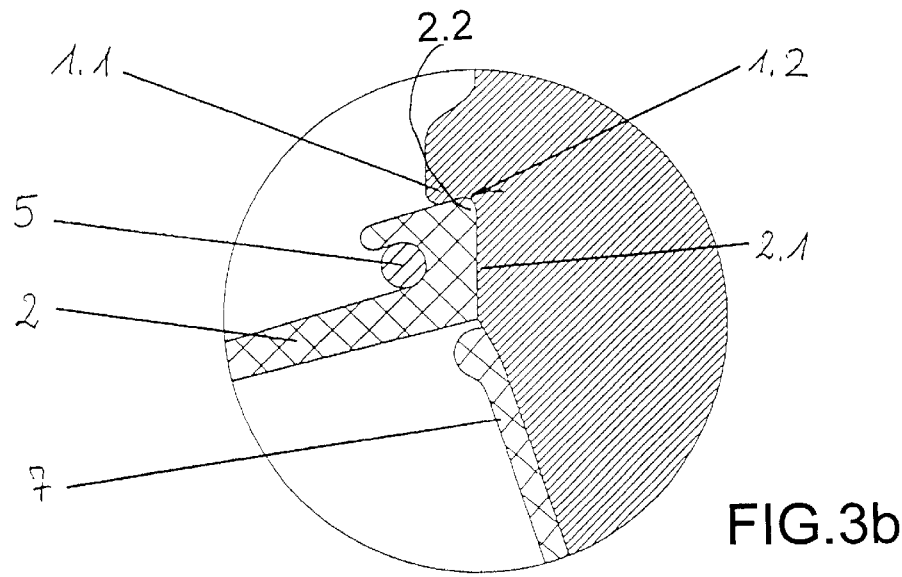
FIG. 3b is a partial sectional view of an L-shaped ring collar of a ball-and-socket joint according to the present invention.
Figure 3C:
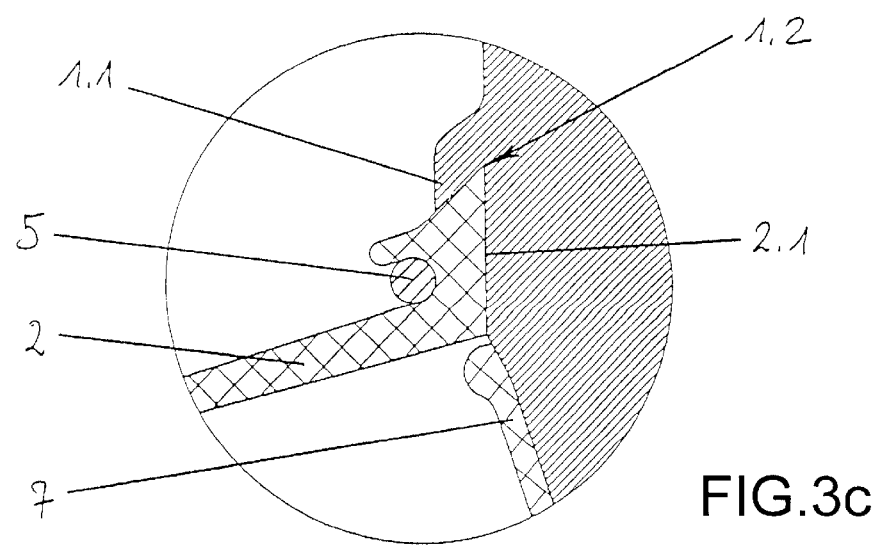
FIG. 3c is a partial section of a V-shaped ring collar of a ball-and-socket joint according to the present invention.

FIGS. 3a, 3b and 3c show partial views of a ball-and-socket joint according to the present invention with U-shaped ring collar, with L-shaped ring collar and V-shaped ring collar, respectively. The collar section 2.1 can be formed with a reinforced bead 2.2 as shown in FIG. 3b.

While specific embodiments of the invention have been shown and described in detail to illustrate the application of the principles of the invention, it will be understood that the invention may be embodied otherwise without departing from such principles.

APPENDIX

LIST OF REFERENCE NUMBERS

1 Ball pivot
1.1 Ring collar
1.2 Annular space
1.3 Joint ball
1.4 Connection area
1.5 Shoulder
2 Sealing element
2.1 Contact area
3 Housing
4 Bearing shell
5 Clamping ring
6 Clamping ring
7 Spacer ring

What is claimed is:

1. A ball-and-socket joint for motor vehicles, comprising:

a ball pivot with a joint ball and a shoulder;

a housing;

a bearing shell inserted into said housing, said bearing shell accommodating said joint ball with said ball pivot projecting from said housing on at least one side movably in all directions, said ball pivot being provided with a connection contour on an end side;

a bellows sealing element having an area in sealing contact with said housing and having an area in sealing contact with said shoulder of said ball pivot;

a circular ring collar made in one piece with said ball pivot, said ring collar being provided with a markedly undercut contour defining an annular space, said sealing element being inserted under elastic pretension into said annular space formed by said undercut contour with said area in sealing contact with said ball pivot;

on a side opposite said joint ball said ball pivot has said connection contour in the form of a circular groove; and said ring collar has a contour of a hook-shaped cross section with a pointed edge area pointing in a direction of said joint ball of said ball pivot.

2. A ball-and-socket joint in accordance with claim 1, wherein said sealing element is provided with a pretension reinforced by at least one tensioning means.

3. A ball-and-socket joint comprising:

a housing;

a ball pivot with a joint ball pivotally arranged in said housing, said ball pivot having a shaft connected to said joint ball and projecting from said housing;

a ring collar extending radially and axially from said shaft to define an annular space between said ring collar and said shaft, said ring collar extending axially from said shaft in a direction toward said joint ball;

a bellows sealing element having a collar section arranged with a compressive biasing force in said annular space.

4. A ball-and-socket joint in accordance with claim 3, wherein:

said annular space has a cross section in one of a U-shape, L-shape and V-shape.

5. A ball-and-socket joint for motor vehicles, comprising:

a ball pivot with a joint ball and a shoulder;

a housing;

a bearing shell inserted into said housing, said bearing shell accommodating said joint ball with said ball pivot projecting from said housing on at least one side movably in all directions, said ball pivot being provided with a connection contour on an end side;

a bellows sealing element having an area in sealing contact with said housing and having an area in sealing contact with said shoulder of said ball pivot;

a circular ring collar made in one piece with said ball pivot, said ring collar being provided with a markedly undercut contour defining an annular space, said sealing element being inserted under elastic pretension into said annular space formed by said undercut contour with said area in sealing contact with said ball pivot;

said sealing element in a contact area of said ball pivot has a reinforced bead which is inserted into said annular space of said ring collar formed by said undercut.

6. A ball-and-socket joint comprising:

a housing;

a ball pivot with a joint ball pivotally arranged in said housing, said ball pivot having a shaft connected to said joint ball and projecting from said housing;

a ring collar extending radially and axially from said shaft to define an annular space between said ring collar and said shaft, said ring collar defines an outer wall of said annular space, said outer wall extends at an acute angle from said shaft a bellows sealing element having a collar section arranged with a compressive biasing force in said annular space.

7. A ball-and-socket joint comprising:

a housing;

a ball pivot with a joint ball pivotally arranged in said housing, said ball pivot having a shaft connected to said joint ball and projecting from said housing;

a ring collar extending radially and axially from said shaft to define an annular space between said ring collar and said shaft;

a bellows sealing element having a collar section arranged with a compressive biasing force in said annular space, said bellows sealing element has a shaft area in sealing contact with said shaft of said ball pivot, said shaft area being adjacent said collar section.

8. A ball-and-socket joint comprising:

a housing;

a ball pivot with a joint ball pivotally arranged in said housing, said ball pivot having a shaft connected to said joint ball and projecting from said housing;

a ring collar extending radially and axially from said shaft to define an annular space between said ring collar and said shaft;

a bellows sealing element having a collar section arranged with a compressive biasing force in said annular space, said collar section of said sealing element having a reinforced bead which is inserted into said annular space.

9. A ball-and-socket joint comprising:

a housing;

a ball pivot with a joint ball pivotally arranged in said housing, said ball pivot having a shaft connected to said joint ball and projecting from said housing;

a ring collar extending radially and axially from said shaft to define an annular space between said ring collar and said shaft;

a bellows sealing element having a collar section arranged with a compressive biasing force in said annular space;

said ring collar radially closes an outer radial side of said annular space.

10. A ball-and-socket joint comprising:

a housing;

a ball pivot with a joint ball pivotally arranged in said housing, said ball pivot having a shaft connected to said joint ball and projecting from said housing;

a ring collar extending radially and axially from said shaft to define an annular space between said ring collar and said shaft;

a bellows sealing element having a collar section arranged with a compressive biasing force in said annular space;

said bellows sealing element has a housing area in sealing contact with said housing;

said ring collar is circular and made in one piece with said ball pivot, said ring collar being provided with a markedly undercut contour defining said annular space;

said shaft of said ball pivot being provided with a connection contour on an end side opposite said joint ball;

said ring collar extends axially from said shaft in a direction toward said joint ball, said ring collar defines an outer wall of said annular space, said outer wall extends one of substantially parallel with a longitudinal axis of said shaft and at an acute angle from said shaft;

said annular space has a cross section in one of a U-shape, L-shape and V-shape;

said bellows sealing element has a shaft area in sealing contact with said shaft of said ball pivot, said shaft area being adjacent said collar section;

said collar section of said sealing element has a reinforced bead which is inserted into said annular space;

a tensioning element is provided for tensioning said bellows sealing element against one of said shaft and said housing.

* * * * *